R. H. MANSON.
PHONOGRAPH LOCKING OR BRAKING DEVICE.
APPLICATION FILED JULY 6, 1915.

1,309,741.

Patented July 15, 1919.

Inventor
Ray H. Manson
By J. O. Ridley
His Atty.

THE COLUMBIA PLANOGRAPH CO., WASHINGTON, D. C.

UNITED STATES PATENT OFFICE.

RAY H. MANSON, OF ELYRIA, OHIO, ASSIGNOR TO THE GARFORD MANUFACTURING COMPANY, OF ELYRIA, OHIO, A CORPORATION OF OHIO.

PHONOGRAPH LOCKING OR BRAKING DEVICE.

1,309,741. Specification of Letters Patent. Patented July 15, 1919.

Application filed July 6, 1915. Serial No. 38,369.

*To all whom it may concern:*

Be it known that I, RAY H. MANSON, a citizen of the United States, residing at Elyria, in the county of Lorain and State of Ohio, have invented certain new and useful Improvements in Phonograph Locking or Braking Devices; and I do hereby declare the following to be a full, clear, and exact description of the invention, such as will enable others skilled in the art to which it appertains to make and use the same.

My invention relates to locking devices or brakes for controlling the record supporting members of phonographs and the like. I am aware that heretofore locking or braking devices have been employed for phonographs, which have been controlled by the diaphragm or sound conducting arm. In phonographs heretofore in use, I am also aware that means have been provided for operating the brake and maintaining it operated when the diaphragm arm is in normal position, but such devices have been open to certain objections, and the object of my invention is to improve the same.

One of the objects of my invention is to provide a locking device or brake in which the arm may be, and in the natural operation of the device is, carried to a position where the needle will be entirely clear of the record before the brake is operated, thus eliminating any tendency to throw down the arm and cause the needle to engage and scratch the record. When such a construction is used, there will be no object in dropping the arm to operate the brake until the record is cleared by the needle.

Another object of my invention is to provide a brake or locking device which will be caused to more firmly lock or brake the disk the farther the arm is moved away from the disk.

Another object of my invention is to provide a locking device in which the disk engaging portion of the device is concealed and another object is to provide a locking device capable of firmly holding the disk in position, and at the same time admitting of certain flexibility to prevent breaking of any of the parts when the device is suddenly or firmly operated.

Other objects of my invention and the invention itself will probably be better understood from a description of an embodiment of the invention.

Figure 1:
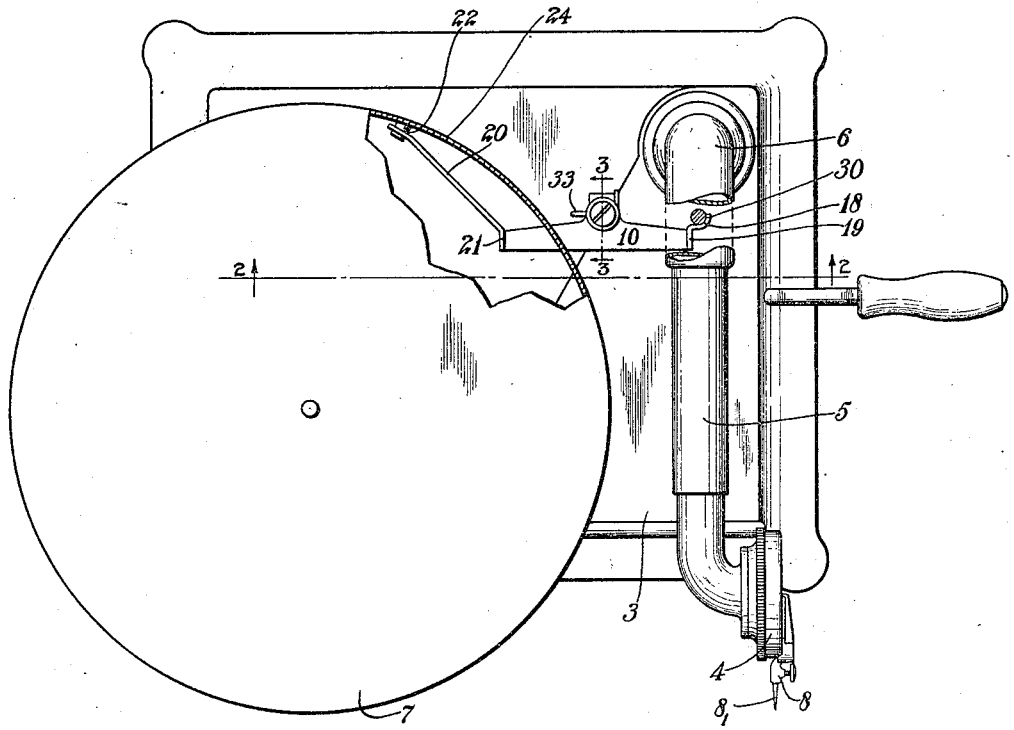
Figure 1 is a plan view of an embodiment of my invention with a portion of the record disk cut away.
Figure 2:
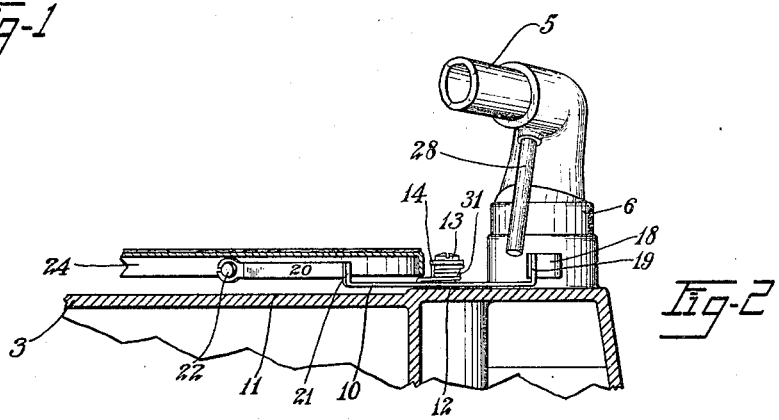
Fig. 2 is a section along the line 2—2 of Fig. 1, looking in the direction of the arrows.
Figure 3:
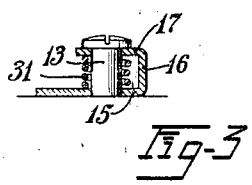
Fig. 3 is a section of a detail through the line 3—3 of Fig. 1.

Referring now to the drawing and to the embodiment of my invention illustrated therein at 3 is shown the body or frame of a phonograph, graphophone, or similar device. The diaphragm is inclosed in a casing 4, which is supported upon an arm 5 pivoted at 6 to the frame by a universal joint, permitting the arm to be moved either in a horizontal plane to engage and disengage records carried by a support 7, or to be moved in a vertical plane, so that the needle $8_1$ carried by the member 8 may be caused to engage and disengage the disk at the will of the operator. The support 7 is here shown as a revoluble disk. All of this structure is well known and constitutes no part of my invention, one of the objects of my invention, as stated, being to improve the brake or locking means for automatically locking and maintaining the disk in a stationary position when the phonograph is not in use, and releasing the same for operation when the needle is set upon the record.

This brake or locking device is shown as consisting of a main portion 10, here shown mounted as to be parallel with the upper surface 11 of the graphophone and as pivoted at 12 to the frame by some suitable means, such as a screw 13. A bracket is formed upon the body portion 10, which is here shown at 14 and consists of an extension 15, extending outward from the member 10, a vertical portion 16 and an arm 17 parallel to the arm 15. The arms 15 and 17 are perforated for the screw 13, which passes therethrough into the frame. These portions are preferably made integral with the main portion 10 of the lock or brake.

A cam is formed upon one end of the member 10, here shown at 18. This cam is connected to an upright arm 19 formed upon one end of the portion 10 of the lock, the members 18 and 19 being preferably integral with the portion 10 of the brake. An arm 20 is connected to the other end of the portion 10, being preferably integral therewith. This arm is connected to the portion 10 through an intermediate member 21, which is turned up substantially at right angles to the portion 10, the part 20 being bent to form an angle with the portion 21, the planes of the portions 20 and 21 being substantially perpendicular to the plane of the member 10. The member 20 carries a disk engaging device or shoe 22, which engages the inside of a peripheral flange 24 formed on the underside of the disk 7. A brake operating device is carried by the arm, here shown as a depending pin 28, which engages the cam, as illustrated in Fig. 1, forcing the brake against the disk and holding it there when the arm is in normal position, as illustrated in Fig. 1. The cam is extended at 30, as shown in Fig. 1, so that the farther the arm is moved to the right, the greater the camming action on the brake and the tighter the disk will be held.

A spring 31 is provided for releasing the disk when the pin 28 is removed from the cam 18. This is preferably a coil spring and is mounted between the portions 15 and 17 of the bracket 14 and surrounds the screw 13, one end 33 of the pin being anchored preferably in an opening in the top of the frame. Owing to the construction of the lock or brake, the arm may be moved outward with the pin clearing the locking device until the needle has cleared the periphery of the record, so that there is no tendency on the part of the locking device to force the arm 5 downward and to cause the needle to inadvertently engage the record and scratch the same. At the same time, there is no object in dropping the arm until the needle has cleared the periphery of the record, since the brake cannot be operated until the arm has reached such a position that the needle is clear of the record. After the record is cleared by the needle, the arm is dropped, the pin naturally falls behind the member 19 and into the space behind the cam 18, where it engages the cam and operates the lock or brake. It will also be seen that the disk engaging member is concealed beneath the record and that since the member 20 possesses some resiliency, the parts cannot be jammed by a sudden operation of the arm.

I have illustrated this particular embodiment and the details thereof for the purpose of better describing my invention, and not with the intention of being limited thereto, as it will be apparent that many departures may be made from both the form and details illustrated, without departing from the spirit of my invention.

I claim:—

1. In a device of the class described, the combination of a frame, a rotatable tablet support on said frame having a downwardly extending peripheral flange, a swinging tone arm pivoted in said frame and adapted to carry a tablet engageable needle, said tone arm adapted to be moved to needle tablet engaging position and to tablet disengaging position, braking and locking mechanism for said tablet, including a flat member extending under the edge of said flange and lying flatwise of the top of the frame, means to pivot said member to the frame between said tablet support and the tone arm, a spring arm integral with said member and at right angles or substantially at right angles thereto, a shoe on one end of said arm adapted to engage the inside surface of the flange, a cam on the other end of said member integral therewith and at right angles thereto and a pin on said tone arm adapted when the arm is moved to tablet disengaging position to engage the said cam, rock said member on said pivot and cause said shoe to engage the flange.

2. In a device of the class described, the combination of a frame, a rotatable record support on said frame provided with a downwardly extending peripheral flange, a swinging tone arm pivoted in said frame, braking mechanism for said support comprising a flat member extending under the edge of the flange and lying flatwise of the frame, a shoe controlled by said member to engage the underside of the flange and a cam on the other end of said member, means to pivot said member to said frame between the support and the tone arm and a device carried by said tone arm for engaging said cam and rocking said member on said pivot to cause the shoe to engage the support.

3. In a device of the class described, the combination of a frame, a rotatable tablet support in said frame having a downwardly extending peripheral flange, a swinging tone arm pivoted in said frame and adapted to carry a tablet engageable needle, said tone arm adapted to be moved to needle tablet engaging position and to tablet disengaging position, braking mechanism for said support including a flat member extending along the top of the frame and pivoted thereto between the tone arm and support, one end of said member extending between the top of the frame and the edge of the downwardly turned flange to the underside of the support, a shoe carrying piece on the end of said member under said support carrying a shoe adapted to engage the underside of said flange, a cam on the other side of said member and a pin carried by said arm for engaging said cam when the arm is moved to record tablet disengaging position to rock said member to cause said shoe to engage the underside of said flange and lock the record support.

4. In a device of the class described, the combination of a frame, a rotatable record support on said frame, a swinging tone arm pivoted in said frame, braking means for said record support, including a flat main portion extending along the top of the frame, means to pivot said mechanism to the frame, including an upwardly extending arm and a horizontal arm, said horizontal arm and said main portion being provided with openings and a pin extending through said openings into the frame, a shoe carried by one end of said mechanism to engage the underside of the support and a cam carried by the other end of said mechanism in the path of a member attached to the swinging tone arm.

5. In a device of the class described, the combination of a frame, a rotatable record support on said frame, a swinging tone arm pivoted in said frame, mechanism controlled by said tone arm for locking said support, comprising a device carried by the tone arm and a member made from a piece of sheet metal, including a flat body portion and a bracket substantially midway its ends provided with openings through which said member is pivoted to the frame, an arm on one end of the frame integral therewith and turned up at right angles thereto and a hook on the other end integral therewith adapted to be engaged by the device carried by the tone arm to move the locking device to locking position, and resilient means for moving said locking device to releasing position.

In witness whereof I have signed my name this 19th day of June, 1915.

RAY H. MANSON.

Copies of this patent may be obtained for five cents each, by addressing the "Commissioner of Patents, Washington, D. C."